Patented Feb. 20, 1951

2,542,071

UNITED STATES PATENT OFFICE 2,542,071

SUSPENSIONS OF POLYMERIC CHLORO-TRIFLUOROETHYLENE

Murray M. Sprung, Schenectady, N. Y., assignor to General Electric Company, a corporation of New York No Drawing. Application November 25, 1949, Serial No. 129,536

12 Claims. (Cl. 260—33.4)

This invention is concerned with suspensions of polymeric chlorotrifluoroethylene. More particularly, the invention relates to a suspension comprising (1) a dispersed phase of finely divided polymeric chlorotrifluoroethylene and (2) a substantially anhydrous dispersing medium comprising (a) a saturated aliphatic monohydric alcohol and (b) a saturated aliphatic dihydric alcohol. The invention also embraces methods for making the above-described suspensions.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene but these have generally been unsuccessful because the limit of solubility of the polymeric chlorotrifluoroethylene in the solvent has been so small as to render it impractical. Attempts to prepare dispersions of polymeric chlorotrifluoroethylene have also been generally unsuccessful because of the poor stability of such dispersions due apparently to the dispersing phases used.

I have now discovered that for the first time it is possible to make substantially stable suspensions of polymeric chlorotrifluoroethylene (any solid polymer thereof may be employed) using as the dispersing medium relatively inexpensive liquids. More particularly, I have discovered that I am able to make stable suspensions of polymeric chlorotrifluoroethylene by first comminuting the polymeric material, for instance, in a micropulverizer, to a fine particle size (about 0.2 to 25 microns average particle size), thereafter mixing the finely divided polymer with a dispersing phase comprising a saturated aliphatic monohydric alcohol and a saturated dihydric alcohol, and finally grinding this mixture, for example in a pebble mill or in a ball mill for a time sufficient to yield a stable suspension.

Suspensions made in accordance with my above-described method are uniformly stable over long periods of time. In addition, even if there should be some slight settling out of the dispersed polymeric material, it is possible by mere stirring, either prior to use or during use, to reinstate the suspension to its original form.

My claimed suspensions have additional advantages over previously described suspensions. Thus they show an appreciable increase in viscosity over that of the solvent combinations involved. Using a mixture of n-hexanol and ethylene glycol, a three-fold increase in viscosity (as measured by flow time through an aperture) was noted after grinding for one to two days with approximately 20 per cent, by weight, of powdered polymeric chlorotrifluoroethylene. In addition, the increased body induces better flow properties, especially in regard to a continuous metallic conductor or wire drawn through the suspension. Moreover, during wire-coating operations, higher "build" (applied film thickness) per pass through a baking oven is achieved. Also, it is possible to use conventional wire enameling dies with more viscous suspensions. Finally a smooth, more uniform, more concentric coating is achieved by virtue of the foregoing properties.

Although some dispersions of a similar polymer, polymeric tetrafluoroethylene, have been made using other materials as a dispersing phase, nevertheless, attempts to use the same dispersing phases with polymeric chlorotrifluoroethylene have been unsuccessful. Moreover, despite extensive investigation, dispersions made with polymeric tetrafluoroethylene have not proved too satisfactory in many applications where my claimed suspensions have been useful.

In my copending application, Serial No. 129,535 filed concurrently herewith and assigned to the same assignee as the present invention, I have disclosed and claimed dispersions of polymeric chlorotrifluoroethylene wherein the dispersing phase comprises water and water-soluble, oxygen-containing compounds boiling above 50° C., including mixtures of saturated aliphatic monohydric alcohols and saturated aliphatic dihydric alcohols. The present invention is based on the discovery that I am also able to make useful, stable suspensions using as the dispersing phase only a mixture of a saturated aliphatic monohydric alcohol and a saturated aliphatic dihydric alcohol mixture. These suspensions have certain advantages over suspensions including water as one of the components, which advantages were unobvious and in no way could have been predicted from the known properties of the suspensions using water. Many of these advantages have been described above.

The amount of monohydric alcohol and dihydric alcohol may be varied within substantially wide limits. Generally, I have found that the liquid monohydric and dihydric alcohols are each advantageously present in an amount equal to from about 5 to 85 per cent, preferably from 20 to 60 per cent, by weight, based on the total weight of these two alcohols, the monohydric alcohol being soluble in the dihydric alcohol at least in the proportions stipulated above.

In order that those skilled in the art may better understand how the present invention may be practiced, the following example is given by way of illustration and not by way of limitation.

EXAMPLE 1

In this example polymeric chlorotrifluoroethylene (no strength temperature 245° C.) was ground in a micropulverizer until the average particle size of the polymer was from about 0.5 to 5 microns. Thereafter this polymer was mixed with ingredients comprising a saturated aliphatic monohydric alcohol and a saturated aliphatic dihydric alcohol in the stipulated proportions and placed in a ball mill and milled for the stated period of time. Table I shows the relationship of the ingredients used as well as the milling time in each case.

Table I

| Sample No. | Weight of Ground Polymer, Grams | Dispersing Phase | Volume of Dispersing Phase Compound, Ml | Milling Time, Hours |
|---|---|---|---|---|
| 1 | 50 | n-Amyl alcohol / Ethylene glycol | 500 / 500 | 71 |
| 2 | 50 | n-Butanol / Ethylene glycol | 500 / 500 | 71 |
| 3 | 50 | 2-Ethylhexanol / Ethylene glycol | 500 / 500 | 71 |
| 4 | 60 | n-Amyl alcohol / Ethylene glycol | 175 / 175 | 48 |
| 5 | 60 | 2-Ethylhexanol / Ethylene glycol | 175 / 175 | 48 |
| 6 | 50 | n-Hexanol / Ethylene glycol | 125 / 125 | 50 |
| 7 | 50 | 2-Methyl-2, 4-pentanediol / n-Hexanol | 500 / 500 | 18 |

All the foregoing suspensions were homogeneous and uniformly stable. Suspension Sample Nos. 4 and 5 were applied to a thin copper wire by passing the latter through the respective suspension and up through a heated vertical baking oven maintained at a maximum air temperature of between bout 300° and 450° C. The surfaces in each case were uniform, flexible, smooth and light-colored, and showed good electrical resistance when tested for such property.

EXAMPLE 2

In this example two different classes of polymeric chlorotrifluoroethylene were employed in making suspensions using as the suspending medium, a mixture of n-hexanol and ethylene glycol in proportions somewhat different from that employed in Example 1. The procedure for making the suspensions was the same as in Example 1. The following table shows the relationship of the ingredients used as well as the milling time employed in making the suspensions.

Table II

| Sample No. | Weight of Ground Polymer, Grams | Dispersing Phase | Volume of Dispersing Phase Compound, Ml | Milling Time, Hours |
|---|---|---|---|---|
| 8 | [1] 165 | n-Hexanol / Ethylene glycol | 417.5 / 417.5 | 96 |
| 9 | [2] 165 | n-Hexanol / Ethylene glycol | 417.5 / 417.5 | 120 |

[1] No strength temperature of about 245° C.
[2] No strength temperature of about 270° C.

Each of the above suspensions which were uniform and homogeneous was used to coat a cadmium plated copper wire. This was done by passing the latter through the respective suspensions in the same manner as disclosed above in Example 1. The run using suspension Sample No. 8 employed an air temperature of about 400° C. and the electrical conductor was passed five times through the dispersion to give a build of insulation around 4 mils thick. The run using suspension Sample No. 9 employed an air temperature of about 450° C. and the same number of passes was made as through suspension Sample No. 8; however, the build-up in thickness of the insulation was about 2.4 mils. In both cases the speed with which the conductors passed through the suspensions and oven was essentially the same.

The two above-treated copper conductors were then tested for abrasion resistance, insulation resistance in mercury and in water, and for dielectric strength. The abrasion tests used the procedure and apparatus described in Flynn et al. application, Serial No. 54,636, filed October 15, 1948, and assigned to the same assignee as the present invention. The following table shows the results of these tests.

Table III

| Suspension Sample No. | Abrasion Resistance Strokes | Insulation Resistance | | Dielectric Strength, KV. |
| | | In Mercury | In Water | |
|---|---|---|---|---|
| 8 | 6 | ∞ | ∞ | 1.8 |
| 9 | 17 | ∞ | ∞ | 1.0 |

Each of the treated electrical conductors was heated at 250° C. for about 21 days. Examination of the conductors showed that they had suffered no ill effects as a result of this thermal test.

It will, of course, be apparent to those skilled in the art that in addition to the concentrations of polymer described above, other concentrations of polymeric chlorotrifluoroethylene may also be employed without departing from the scope of the invention. Thus, I may use an amount of polymer ranging, by weight, from about 1 to 50 per cent, preferably from 5 to 30 per cent, of the total weight of the polymer and the dispersing phase.

In addition to the monohydric alcohols employed in the above examples, other liquid (i. e., at normal temperatures, e. g., 25° C.) monohydric alcohols, especially saturated aliphatic monohydric alcohols, preferably containing at least three and not more than twelve carbon atoms, may also be employed. Among such alcohols may be mentioned, for instance, n-propyl alcohol, isopropyl alcohol, n-pentanol, t-butyl alcohol, 2-methylbutanol, 3-methyl-2-butanol, the various nonyl alcohols, propyl hexyl carbinol, diethyl amyl carbinol, etc.; ether monohydric alcohols, e. g., β-ethoxyethanol, β-propoxyethanol, β-methoxyethoxyethanol, β-ethoxyethoxyethanol, etc. I prefer to use a liquid monohydric saturated aliphatic alcohol having a boiling point above 50° C., e. g., around 100° C. or higher.

Among the liquid, aliphatic dihydric alcohols which may be employed in addition to those used in the foregoing examples may be mentioned, for instance, trimethylene glycol, propylene glycol, 1,2-butylene glycol, 1,3-butylene glycol, 2,3-butylene glycol, tetramethylene glycol, diethylene glycol, dipropylene glycol, 2-ethyl-2,4-pentanediol, etc. Although trihydric alcohols may be employed, nevertheless I have found it more advantageous to confine my invention to the use of dihydric alcohols. The ratio of diol to monol may be varied within the limits mentioned above, the practical limits being the limits of miscibility of the two components involved in the dispersing phase.

In general, it is desirable to grind the pulverized solid polymer with the liquid mixture of monohydric and dihydric alcohols in a ball mill for several days. However, for purposes of successful application to, e. g., magnet wire, it may not be necessary to grind for more than 24 to 72 hours, provided the original polymer has been reduced to the order of magnitude of at least 0.2 to 25 microns average particle size before grinding. No heating is necessary at any time for making the suspensions. Generally the time required for ball-mill grinding to give a satisfactory stable suspension may range from about one-half to fifteen days or more, and advantageously, in the case of the examples described above, from about one to eight days.

The suspensions of polymeric chlorotrifluoroethylene described above may be employed in various ways. They may be used for coating and impregnating various fillers, such as, for example, glass cloth, glass batting, asbestos cloth or asbestos floats, mica, etc. If desired, the suspensions may be advantageously employed to make molding compositions by adding to the suspension various inert inorganic fillers to obtain a homogeneous mixture and thereafter removing the water and oxygen-containing component of the dispersing phase from the mixture. Laminated products may also be prepared by coating and impregnating sheet material and superposing layers of the impregnated and coated material and pressing the total assembly under heat and pressure to cause fusing of the polymer and to give a homogeneous article. In some coating applications as, for instance, in the coating of electrical conductors such as magnet wire, it may be advantageous to add varying amounts, for example, from one to twenty-five per cent, by weight, of a finely ground pigment or filler to the suspensions. Among such pigments and fillers which may be employed are, for example, catalpa clay, bentonite, mica dust, titanium dioxide, silica, lead silicate, lead titanate, etc.

Among the advantages realized in using the suspensions of polymeric chlorotrifluoroethylene may be mentioned the effect of using such suspensions with terratex (bentonite-asbestos films) which in the untreated form has a tensile strength of the order of about 240 to 300 p. s. i. Treatment of samples of terratex with suspensions of polymeric chlorortifluoroethylene has increased this tensile strength markedly. Thus, the addition of about 33 per cent, by weight, of the polymer to the terratex by dipping the latter in a suspension of the polymer raised the crosswise tensile strength to 390 p. s. i. and the lengthwise tensile strength to 490 p. s. i. The addition of 53 per cent, by weight, polymer increased the crosswise tensile strength to 720 p. s. i. and the lengthwise tensile strength to 890 p. s. i. When 65 per cent, by weight, of polymer was added, the crosswise tensile strength was 820 p. s. i. and the lengthwise tensile strength equaled 1400 p. s. i. In each case, the terratex showed increased flexibility and uniformity as a result of the treatment with the dispersion of the polymeric chlorotrifluoroethylene.

What I claim as new and desire to secure by Letters Patent of the United States is:

1. A substantially stable suspension comprising (1) a dispersed phase comprising polymeric chlorotrifluoroethylene as the sole polymeric ingredient and (2) a substantially anhydrous dispersing phase comprising (a) a saturated aliphatic monohydric alcohol and (b) a saturated aliphatic dihydric alcohol.

2. A substantially stable suspension comprising (1) a dispersed phase comprising polymeric chlorotrifluoroethylene as the sole polymeric ingredient and (2) a substantially anhydrous dispersing phase comprising (a) n-amyl alcohol and (b) ethylene glycol.

3. A substantially stable suspension comprising (1) a dispersed phase comprising polymeric chlorotrifluoroethylene as the sole polymeric ingredient and (2) a substantially anhydrous dispersing phase comprising (a) n-butanol and (b) ethylene glycol.

4. A substantially stable suspension comprising (1) a dispersed phase comprising polymeric chlorotrifluoroethylene as the sole polymeric ingredient and (2) a substantially anhydrous dispersing phase comprising (a) 2-ethylhexanol and (b) ethylene glycol.

5. A substantially stable suspension comprising (1) a dispersed phase comprising polymeric chlorotrifluoroethylene as the sole polymeric ingredient and (2) a substantially anhydrous dispersing phase comprising (a) n-hexanol and (b) 2-methyl-2,4-pentanediol.

6. The method of making a stable suspension which comprises (1) forming a mixture of ingredients comprising (a) finely divided polymeric chlorotrifluoroethylene as the sole polymeric ingredient, (b) a saturated aliphatic monohydric alcohol, and (c) a saturated aliphatic dihydric alcohol, and (2) grinding the aforementioned ingredients until a homogeneous suspension is obtained.

7. The method of making a stable suspension which comprises (1) forming a mixture of ingredients comprising (a) finely divided polymeric chlorotrifluoroethylene as the sole polymeric ingredient, (b) n-amyl alcohol, and (c) ethylene glycol, and (2) grinding the aforementioned ingredients until a homogeneous suspension is obtained.

8. The method of making a stable suspension which comprises (1) forming a mixture of ingredients comprising (a) finely divided polymeric chlorotrifluoroethylene as the sole polymeric ingredient, (b) n-butanol, and (c) ethylene glycol, and (2) grinding the aforementioned ingredients until a homogeneous suspension is obtained.

9. The method of making a stable suspension which comprises (1) forming a mixture of ingredients comprising (a) finely divided polymeric chlorotrifluoroethylene as the sole polymeric ingredient, (b) 2-ethylhexanol, and (c) ethylene glycol, and (2) grinding the aforementioned ingredients until a homogeneous suspension is obtained.

10. The method of making a stable suspension which comprises (1) forming a mixture of ingredients comprising (a) finely divided polymeric chlorotrifluoroethylene as the sole polymeric ingredient, (b) n-hexanol, and (c) 2-methyl-2,4-pentanediol, and (2) grinding the aforementioned mixture of ingredients until a homogeneous suspension is obtained.

11. A substantially stable suspension comprising (1) a dispersed phase comprising polymeric chlorotrifluoroethylene as the sole polymeric ingredient and (2) a substantially anhydrous dispersing phase comprising (a) n-hexanol and (b) ethylene glycol.

12. The method of making a stable suspension which comprises (1) forming a mixture of ingredients comprising (a) finely divided polymeric chlorotrifluoroethylene as the sole polymeric ingredient, (b) n-hexanol, and (c) ethylene glycol, and (2) grinding the aforementioned ingredients until a homogeneous suspension is obtained.

MURRAY M. SPRUNG.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,412,960 | Berry | Dec. 24, 1946 |
| 2,440,190 | Alfthan | Apr. 20, 1948 |
| 2,448,952 | Berry | Sept. 7, 1948 |
| 2,484,483 | Berry | Oct. 11, 1949 |